US006909049B2

(12) United States Patent
DiTroia

(10) Patent No.: US 6,909,049 B2
(45) Date of Patent: Jun. 21, 2005

(54) ELECTRICAL CONNECTOR FOR ANGLED CONDUCTORS

(75) Inventor: Gary W. DiTroia, Brookline, NH (US)

(73) Assignee: FCI Americas Technologies, Inc., Reno, NV (US)

( * ) Notice: Subject to any disclaimer, the term of this patent is extended or adjusted under 35 U.S.C. 154(b) by 174 days.

(21) Appl. No.: 10/138,716

(22) Filed: May 3, 2002

(65) Prior Publication Data

US 2003/0205401 A1 Nov. 6, 2003

(51) Int. Cl.[7] .......... H02G 15/08
(52) U.S. Cl. .......... 174/84 C
(58) Field of Search .......... 174/84 C, 94 R

(56) References Cited

U.S. PATENT DOCUMENTS

| | | | | |
|---|---|---|---|---|
| 1,397,040 A | * 11/1921 | Dillon | 16/108 |
| 2,580,269 A | * 12/1951 | Alvarez | 174/84 C |
| 3,787,801 A | 1/1974 | Teagno et al. | 339/258 R |
| 3,935,730 A | 2/1976 | Luongo et al. | 73/100 |
| 4,148,136 A | 4/1979 | Waddington et al. | 29/629 |
| 4,209,895 A | 7/1980 | Powell | 29/874 |
| 4,771,538 A | 9/1988 | O'Loughlin et al. | 29/874 |
| 4,976,627 A | 12/1990 | O'Loughlin | 439/100 |
| 4,993,959 A | 2/1991 | Randolph | 439/92 |
| 5,567,185 A | 10/1996 | Henderson et al. | 439/733.1 |
| 5,730,629 A | 3/1998 | Samejima et al. | 439/855 |
| 6,086,434 A | 7/2000 | Rollero et al. | 439/852 |
| 6,190,215 B1 | 2/2001 | Pendleton et al. | 439/853 |
| 6,224,433 B1 | 5/2001 | Chadbourne et al. | 439/877 |

OTHER PUBLICATIONS

Burndy Products Catalog, FCI USA, Inc., pp D–3, D–4, D–5 and N–26, 2000.

* cited by examiner

*Primary Examiner*—Chau N. Nguyen
(74) *Attorney, Agent, or Firm*—Harrington & Smith, LLP

(57) ABSTRACT

An electrical connector for connecting at least two angled conductors together. The electrical connector includes a first section and a second section. The first section has a first conductor receiving channel with a first channel axis. The second section has a second conductor receiving channel with a second channel axis angled relative to the first channel axis. The first and second sections are comprised of a single extruded metal member which has been formed to angle the first and second channel axes relative to each other.

2 Claims, 2 Drawing Sheets

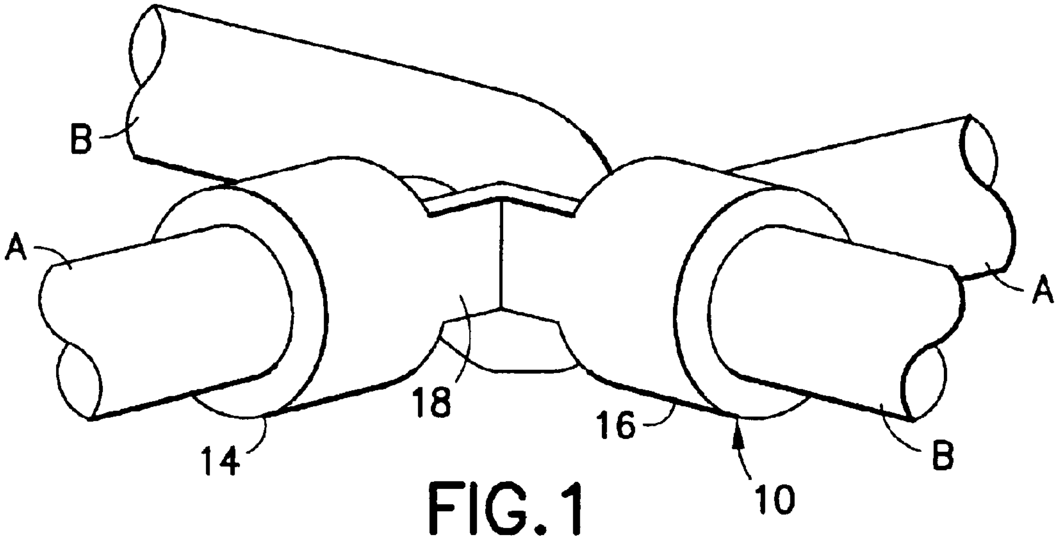
FIG. 1
FIG. 2
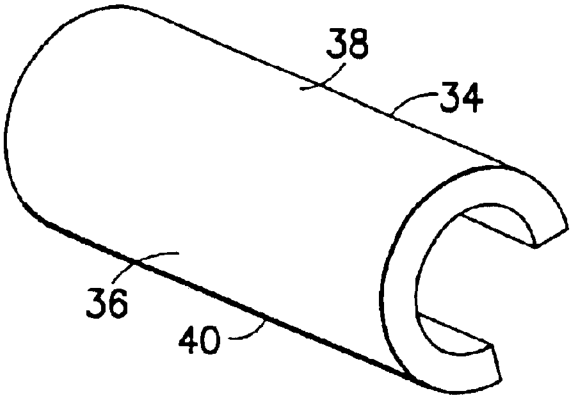
FIG. 3
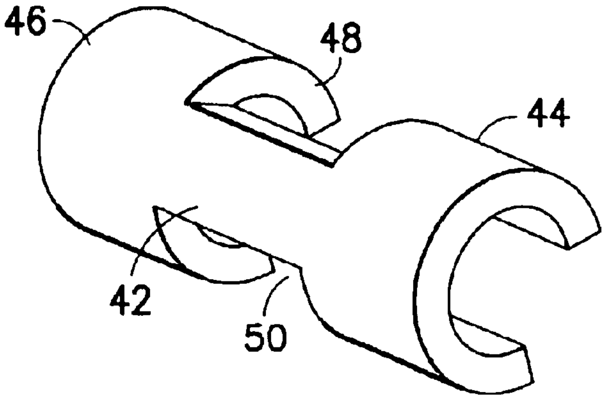

ELECTRICAL CONNECTOR FOR ANGLED CONDUCTORS

BACKGROUND OF THE INVENTION

1. Field of the Invention

The present invention relates to electrical connectors and, more particularly, to an electrical connector for connecting electrical conductors which are angled relative to each other.

2. Brief Description of Prior Developments

U.S. Pat. No. 6,224,433 discloses an electrical connector for connecting two conductive crossing bars to each other. The connector comprises a first section and an angled second section comprised of a single metal member. FCI USA, Inc. manufactures and sells a cross connector (model YGL-C) for use in a ground grid network sold under the trademark HYGRID. The HYGID cross connector comprises two compression connector elements connected to each other by an angled bar. The compression connector elements can be compressed or crimped onto grounding conductors or a ground rod by a hydraulic compression tool, such as a Y750 manufactured and sold by FCI USA, Inc.

Cross connections are connections often made in ground grid networks. A cross connection is the joining of two conductors running perpendicular or substantially perpendicular or angled relative to one another. Previous compression connection technologies used for cross connections in ground grid networks include the YGL type connector noted above. These connectors provide a high-quality connection, but are costly to manufacture. Thomas and Betts produces a compression cross connection from a one-piece stamping. The dies needed to form this connector are highly specialized and, therefore, costly. The one-piece stamping design is also not readily accepted in the market due to its lack of perceived quality.

There is a desire for a compression cross connection which is less costly to manufacture than current multi-piece compression connectors and less costly to manufacture than current one-piece stamping connectors, and which does not suffer from a perceived lack of quality in the marketplace such as a stamped design.

SUMMARY OF THE INVENTION

In accordance with one aspect of the present invention, an electrical connector is provided for connecting at least two angled conductors together. The electrical connector includes a first section and a second section. The first section has a first conductor receiving channel with a first channel axis. The second section has a second conductor receiving channel with a second channel axis angled relative to the first channel axis. The first and second sections are comprised of a single extruded metal member which has been formed to angle the first and second channel axes relative to each other.

In accordance with another aspect of the present invention, an electrical connector is provided for connecting first and second crossing conductors together. The electrical connector comprises a first section, a second section, and a third section. The first section has a same cross sectional shape as the second section.

The second section has a general cross sectional C shape. The third section connects the first and second sections to each other. The first, second and third sections are comprised of a single extruded metal member which has been formed to angle the first section relative to the second section with a bend in the third section.

In accordance with one method of the present invention, a method of manufacturing an angled conductor electrical connector is provided comprising steps of extruding a metal member having a channel therein; and bending the metal member such that the channel forms two angled conductor receiving areas, each conductor receiving area having a channel axis angled relative to each other.

BRIEF DESCRIPTION OF THE DRAWINGS

The foregoing aspects and other features of the present invention are explained in the following description, taken in connection with the accompanying drawings, wherein:

FIG. 1 is a perspective view of an electrical connector incorporating features of the present invention shown connecting two angled conductors to each other;

FIG. 2 is a perspective view of an extruded metal member used to form the connector shown in FIG. 1;

FIG. 3 is a perspective view of the extruded metal member shown in FIG. 2 having portions of a middle section removed;

DETAILED DESCRIPTION OF THE PREFERRED EMBODIMENTS

Figure 4:
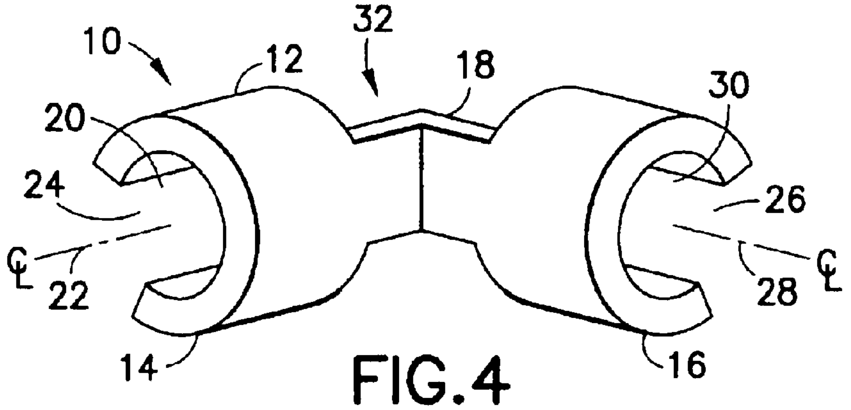
FIG. 4 is a perspective view of the extruded metal member shown in FIG. 3 having its middle section bent to form the electrical connector shown in FIG. 1.

Referring to FIG. 1, there is shown a perspective view of an electrical connector 10 incorporating features of the present invention shown connecting two electrical conductors A, B to each other. Although the present invention will be described with reference to the exemplary embodiments shown in the drawings, it should be understood that the present invention can be embodied in many alternate forms of embodiments. In addition, any suitable size, shape or type of elements or materials could be used.

Referring also to FIG. 4, the connector 10 generally comprises a one-piece member 12 comprised of electrically conductive metal. However, in alternate embodiments, the connector 10 could comprise more than one member and could be comprised of any suitable type of material(s) so long as the connector is preferably electrically conductive. The connector 10 generally comprises a first section 14, a second section 16, and a third section 18. In alternate embodiments, the connector could comprise more than three sections.

The first section 14 has a general cross sectional C shape. However, in alternate embodiments, the first section could comprise any suitable type of cross sectional shape. For example, the first section could comprise a cross sectional shape having multiple parallel conductor receiving channels therealong. As another example, the first section 14 could comprise an asymmetric design. In this asymmetric design, instead of a uniform "C" shape, the upper portion could be closed more than the lower portion, or could be squared off, or could have any suitable different shape than the lower portion. The general cross sectional C shape forms a first conductor receiving channel 20 with a first channel axis 22. In the embodiment shown, the channel 20 has a uniform cross-section along its length. However, in an alternate embodiment, the channel 20 could taper along its length, or have an otherwise non-uniform cross-section along its length. The first section 14 includes a slot 24 through a side thereof into the channel 20. However, in alternate embodiments, the side slot 24 might not be provided.

The second section 16 has a same cross sectional shape as the first section 14; namely, a general cross sectional C shape. However, in alternate embodiments, the second section could comprise any suitable type of cross sectional shape. For example, the second section could comprise a cross sectional shape having multiple conductor receiving channels therealong. As another example, the second section 16 could comprise an asymmetric design. In this asymmetric design, instead of a uniform "C" shape, the upper portion could be closed more than the lower portion, or could be squared off, or could have any suitable different shape than the lower portion.

In a preferred embodiment, the cross sectional shape of the second section 16 is the same as the cross sectional shape of the first section 14. However, in alternate embodiments, the shapes of the first and second sections 14, 16 could be altered to be different from each other. The general cross sectional C shape of the second section 16 forms a second conductor receiving channel 26 with a second channel axis 28. In the embodiment shown, the channel 26 has a uniform cross-section along its length. However, in an alternate embodiment, the channel 26 could taper along its length, or have an otherwise non-uniform cross-section along its length. The second section 16 includes a slot 30 through a side thereof into the channel 26. However, in alternate embodiments, the side slot 26 might not be provided.

The third section 18 connects the first section 14 to the second section 16. The third section 18 has a significantly different cross sectional shape than the first and second sections 14, 16. The third section 18 has a general bent shape with a substantially open top side and a substantially open bottom side. Because the third section 18 has substantially open top and bottom sides, the cross sectional size of the third section 18 is substantially smaller than the cross sectional sizes of the first and second sections 14, 16. In the embodiment shown, the third section is bent and forms an angle between the first and second sections of about 90 degrees. However, in alternate embodiments, the angle provided by the third section 18 could be more or less than 90 degrees, such as about 45 degrees or more.

The angle provided by the third section 18 forms the first and second sections 14, 16 angled relative to each other. This angle provided by the third section 18 also angles the first and second channel axes 22, 28 relative to each other. In the embodiment shown, the two axes 22, 28 are angled relative to each other about 90 degrees. However, any suitable angle could be provided.

As seen with reference to FIG. 1, the connector 10 can be used to connect the two conductors A, B to each other. The two conductors A, B are angled relative to each other at an angle of about 90 degrees. The two conductors A, B are crossed ground conductors. However, in an alternate embodiment the conductors could comprise an end of grounding rod and a portion of a ground conductor cable, such as an end of the cable, located at a right angle to each other. Because the third section 18 merely forms a connecting beam between the first and second sections 14, 16, and the outer side of the third section at area 32 is substantially open, the third section 18 does not form conductor receiving channels therealong. Instead, the area 32 is open.

The third section 18 forms a substantially open area 32 at the intersection of the two axes 22, 28 with each other. The third section 18 extends along only one side of this open area 32. The open area 32, except for the one side which comprises the third section 18, is substantially open such that the conductors A, B passing through the conductor receiving channels 20, 26 can overlap and bypass each other in the open area 32 if necessary. The third section 18 can be provided with any suitable length to accommodate stiffnesses in the conductor cables A, B.

In the embodiment shown, the first and second sections 14, 16 are suitably sized and shaped to be compressed by a tool, such as the Y750 hydraulic compression tool mentioned above. The hydraulic compression tool can compress or crimp the first and second sections 14, 16 onto the conductors A, B to form fixed mechanical and electrical connections. In a preferred embodiment, the first and second sections 14, 16 are sufficiently thick to be compressed onto the conductors A, B and retain the mechanical connection formed thereat. The slots 24, 30 in the first and second sections 14, 16 assist in allowing the first and second sections to be compressed onto a variety of different sizes of electrical conductors. Thus, the first and second sections 14, 16 can each receive a range of different electrical conductors therein. However, in alternate embodiments, the range taking feature might not be provided. The third section 18 has sufficient cross sectional size to carry the current transferred between the conductors A and B.

Referring now also to FIGS. 2 and 3, one method for manufacturing the electrical connector 10 will be described. The one-piece member 12 is preferably comprised of a one-piece extruded member 34 which is subsequently formed into the one-piece member 12. In the embodiment shown, the one-piece member 34 is extruded with a general cross sectional C shape. However, in alternate embodiments, the one-piece member 34 could be extruded with any suitable type of cross sectional shape including, for example, a cross sectional shape which comprises multiple parallel conductor receiving channels.

After the one-piece member 34 is extruded, its middle section 36 has its top and bottom sections 38, 40 removed to produce the middle section 42 and two end sections 44, 46 shown in FIG. 3. In a preferred method of removing the top and bottom sections 38, 40, the one-piece member 34 is machined to remove these top and bottom sections. However, in alternate embodiments, any suitable method for removing the top and bottom sections could be provided. The middle section 42 is thus provided with generally open top and bottom sides 48, 50 between the two end sections 44, 46. The middle section 42 is then bent to form the third section 18 as shown in FIG. 4. The reduced size of the middle section 42 allows easier bending of the middle section to form the third section 18. However, the thickness of the middle section 42 allows the third section 18 to retain its shape once bent.

After the middle section 42 is bent to form the third section 18, the end sections 44 and 46 automatically form the first and second sections 14, 16. Thus, the formation of the connector 10 is complete. However, in alternate embodiments, the connector 10 could be additionally processed, such as placing or plating material on the inside of the conductor receiving channels 20, 26.

The new cross connector of the present invention can be used to form a compression connection manufactured from a high-quality extrusion that is subsequently machined and formed into the final configuration. This connection, based on possible minor design variations, is capable of accommodating one or more conductors per side, ground rod connections, structural steel, or other types of cross connections and taps that are currently associated with grounding connection applications.

The present invention can be used to provide a true right angle connection with no wire forming being necessary before the connection. Prior art low-cost crossing conductor designs have required the use of 45 degree angles and wire forming of the crossing conductors. The present invention could be used with existing hydraulic tools and hydraulic tool dies for installation. Due to the use of compression technology, the first and second sections 14, 16 can be range taking. The connection can be range taking depending on the size and/or shape of the "C" opening and amount of closure obtained with the compression tool dies.

Extrusion dies are relatively inexpensive as compared to prior art forming dies for sheet metal connector designs. Also, the one-piece design of the present invention requires no secondary assembly operations that require increased production costs. Thus, the present invention can provide lower manufacturing costs. Because of the extrusion process, the present invention can provide a connector which can provide a very high-quality connection. Unlike the YGL type designs which require four connections to be installed (one to the conductor and one to the bail per side), the present invention can be used with a single connection being made onto each conductor at each end section 14, 16. Thus, because only two connections are being made rather than four, installed connectors can be more resistant to mechanical stress and long-term corrosion with a connector incorporating features of the present invention. With the present invention, there is also much less electromagnetic forces developed within the connection due to shorter conductive paths.

Figure 5:
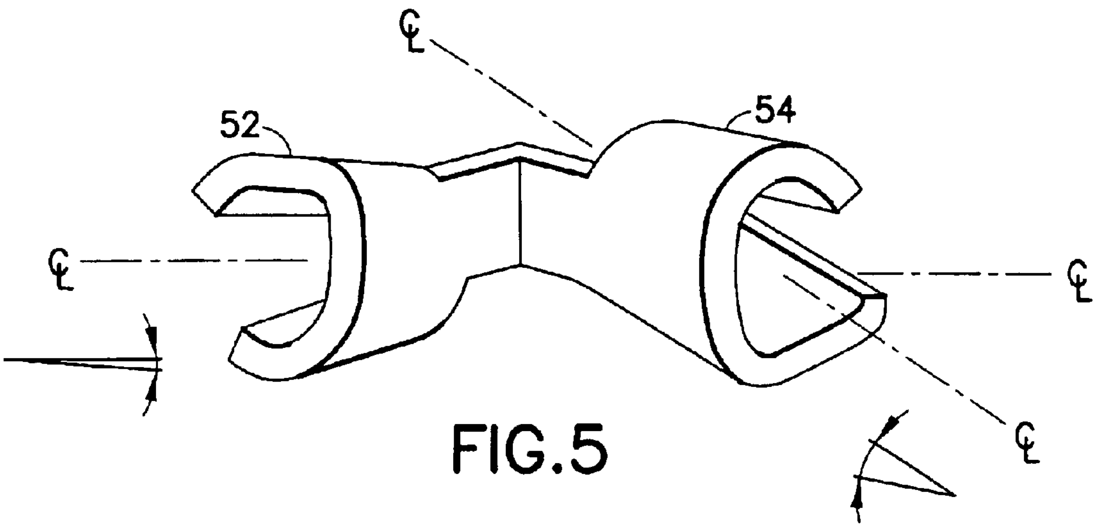
FIG. 5 is a perspective view of an alternate embodiment of the present invention.

In one type of alternate embodiment the first and second sections 14, 16 can comprise tapered ends and a non-uniform upper to lower configuration of the general "C" shape. This can allow the opposing end tips of the "C" shapes to overlap when the tips come together during crimping. This functionality (using overlapping tips rather than butting tips) can enable range-taking of different size conductors to be more successful. An example of this alternate embodiment is shown in FIG. 5. In this embodiment the first section 52 has a tapered shape and a non-uniform upper to lower configuration of the general "C" shape. The second section 54 has a tapered shape and a non-uniform upper to lower configuration of the general "C" shape. This embodiment is intended to be merely exemplary of some of the features which can be used with the present invention.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An electrical connector for connecting first and second crossing conductors together comprising:

a first section having a general cross sectional C shape;

a second section having a general same cross sectional shape as the first section; and a third section connecting the first and second sections to each other, wherein the first, second and third sections are comprised of a single extruded metal member which has been formed to angle the first section relative to the second section with a bend in the third section, wherein the extruded metal member is sized and shaped to be attached to the first and second crossing conductors with the first conductor being located in the first section but not in the second section and the second conductor located in the second section but not in the first section, and wherein the extruded metal member is adapted to form a cross connection with the first and second conductors crossing over and under each other at an angle proximate the third section between the first and second sections, and wherein the bend in the third section comprises an angle of about 90 degrees.

2. An electrical connector as in claim 1 wherein the third section has substantially open top and bottom sides and does not form a conductor receiving channel therein.

* * * * *